Oct. 5, 1954 W. I. JONES 2,690,605
FASTENING DEVICE
Filed April 6, 1951
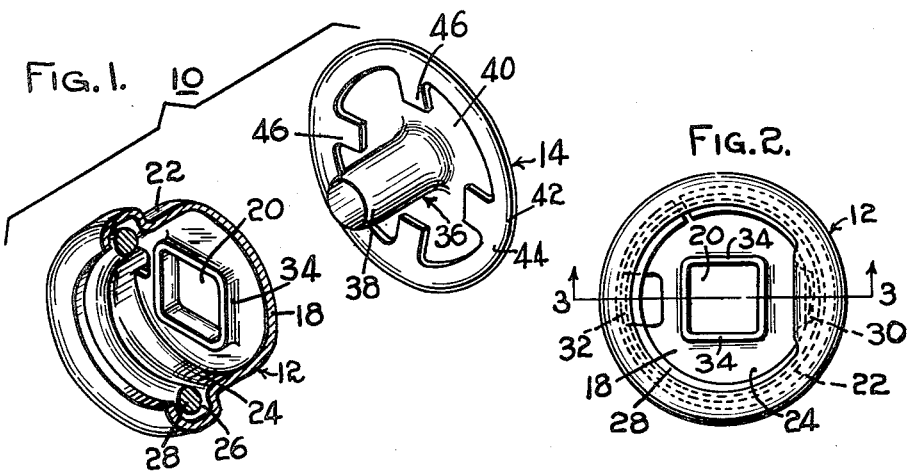
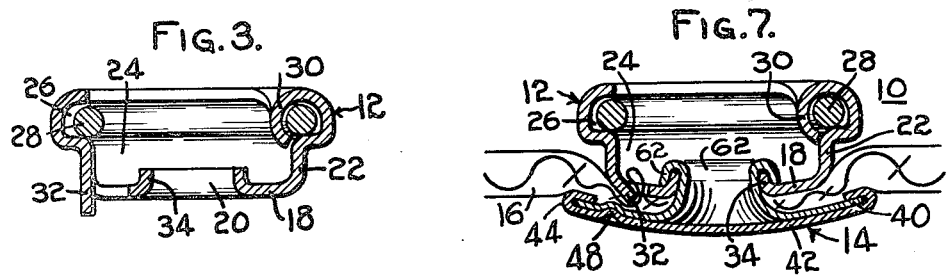
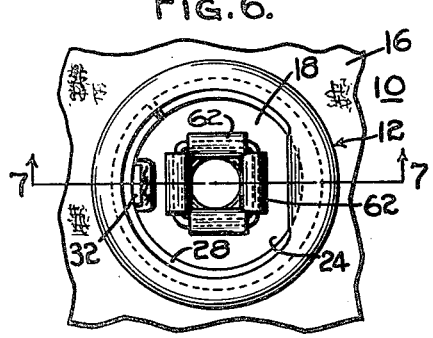
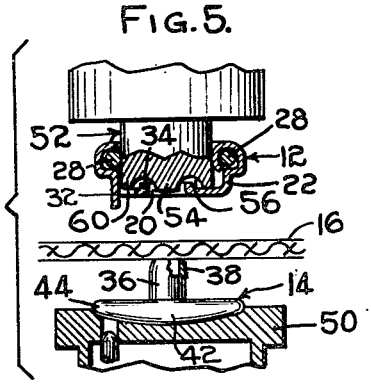
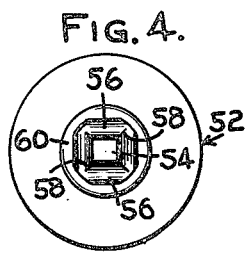
INVENTOR:
WALTER I. JONES,
BY Robert E. Ross
AGENT.

Patented Oct. 5, 1954

2,690,605

UNITED STATES PATENT OFFICE 2,690,605

FASTENING DEVICE

Walter I. Jones, Belmont, Mass., assignor to United-Carr Fastener Corporation, Cambridge, Mass., a corporation of Massachusetts Application April 6, 1951, Serial No. 219,602

2 Claims. (Cl. 24—216)

This invention relates generally to snap fastener socket members, and has particular reference to the type of snap fastener sockets known as the three side lock type and to snap fastener assemblies utilizing such socket members.

There are in common use several types of three side lock snap fastener sockets, which are so constructed that an inserted stud can be released from engagement therewith only by a separating force applied to one predetermined side of the assembly, and such sockets are commonly used in applications where it is desired that the supporting sheet may become disengaged from a second sheet from one direction only. Consequently, such sockets must be rigidly attached to the supporting sheet in such a manner as to prevent any possibility of rotation of the socket relative to the sheet, otherwise disengagement of the sheets might occur when separating forces are applied thereto from other directions. This type of socket is commonly attached to the supporting sheet by an attaching member disposed on the opposite side of the sheet, which has a rivet extending through the sheet to enter an opening in the socket base, so that the end of the rivet may be flared outwardly against the base to retain the parts in assembly on the sheet.

To indicate the unlocking side of such an assembly, it is common to provide indicia on the exposed portion of the attaching member, and for this reason it is essential that the socket and the attaching member be so attached that rotation of the attaching member relative to the socket is impossible, otherwise the position of the indicia thereon may become misoriented in relation to the unlocking side of the socket.

The object of the invention is to provide a snap fastener socket member in which means is provided on the attaching base thereof for engagement with an inserted attaching member rivet in such a manner that rotation of the socket relative to the attaching member is prevented.

A further object of the invention is to provide a snap fastener socket assembly comprising a socket member and an attaching member in which the socket base is provided with a non-circular opening therein and upwardly extending portions disposed about the opening, and said attaching member has a rivet extending into the openings with curled out end portions engaging said upwardly extending portions on the socket.

A still further object of the invention is to provide a socket member and an attaching member having cooperating engaging means to permit non-rotatable assembly in which means are provided on the attaching member and the socket for cooperating interlocking engagement when assembled to prevent rotation of the parts relative to the sheet to which they are attached and to prevent rotation of the parts relative to the sheet.

Other objects of the invention will, in part, be obvious, and will, in part, appear hereinafter.

In the drawing:

Fig. 1 is a perspective view of a socket member and an attaching member embodying the features of the invention, in which the socket member is partly broken away to illustrate certain features thereof;

Fig. 2 is a top plan view of the socket member of Fig. 1;

Fig. 3 is a view in section taken on line 3—3 of Fig. 2;

Fig. 4 is a plan view of a die used in attaching the members to a supporting sheet;

Fig. 5 is a view in elevation, partly in section, of the socket member and the attaching member in position with the die for attachment to the supporting sheet;

Fig. 6 is a top plan view of the assembled socket; and

Fig. 7 is a view in section taken on line 7—7 of Fig. 6.

Referring to the drawing, there is illustrated a snap fastener socket assembly 10, comprising a socket member 12 and an attaching member 14 which are adapted for assembly onto opposite sides of a supporting sheet 16.

The socket member 12 is of the three side lock type, and comprises generally an attaching base 18 having an opening 20 disposed centrally therein, an upstanding wall 22 disposed about the base to form a cavity 24 for receiving a shouldered stud (not shown). To provide means for engaging the shouldered stud, a peripheral recess 26 is formed in the upper portion of the wall, to receive a split ring spring member 28. To impart a locking feature to the socket, a locking tab 30 is provided which is an extension of the wall and curls around the spring 28 at one portion of the periphery. The operation of this type of three side lock is fully described in an application entitled Snap Fastener, Serial No. 191,406, filed October 21, 1950, which issued on July 7, 1953, as Patent No. 2,644,214 and which was assigned to the same assignee as this application, and the structure of the locking feature is not a part of the present invention, but is shown herein as merely being illustrative of one type of three side lock socket that is adapted for use with the present invention.

The socket base is also provided with a deformable tab 32 which is formed from the metal of the base 18 and extends outwardly therefrom near the periphery to engage the supporting sheet when the socket is attached in a manner to be described hereinafter.

In the preferred embodiment, the central opening 20 is substantially square, and the portions of the base adjacent the edges of the opening are turned upwardly out of the plane thereof to provide four lips 34.

The attaching member 14 comprises generally a rivet 36 having a tubular attaching end 38 and a flange portion 40 at the other end, over which a cap member 42 is disposed. The cap 42 is retained thereon by an inwardly turned peripheral portion 44, and is provided with a number of arms 46 which extend radially inwardly from the peripheral portion to cooperate with the tab 32 on the socket in a manner to appear hereinafter. To provide means for locating the unlocking side of the assembly, the exposed portion of the cap 42 may be provided with indicia such as a dot 48, which may be embossed into the cap during the attaching operation.

The method of assembly of the socket and the attaching member onto the supporting sheet is illustrated in Fig. 5. The attaching member 14 is placed on a base 50, which has a concave upper surface to conform to the shape of the face of the attaching member, and the sheet 16 is placed over the rivet 36. The socket member 12 is assembled onto a die 52, which comprises a square end 54 and four curling portions 56 disposed thereabout which intersect at four relatively sharp edges 58. An outer depending rim 60 is disposed about the curling portions, so that when the die is inserted into the cavity 24 of the socket, the rim 60 seats against the base to properly position the socket thereon. The die 52 carrying the socket 12 is then lowered onto the attaching member so that the attaching end 38 of the rivet enters the opening 20 in the socket base, and the square end 54 of the die enters the end 38 of the rivet. As the die is lowered further, the four sharp edges 58 split the end of the rivet into four segments 62 which are curled outwardly and downwardly by the curling portions 56, so that each segment 62 passes over and encloses an adjacent upwardly turned lip 34 at the edge of the opening. Each lip is thereby retained securely between inner and outer portions of a segment of the eyelet, so that the attaching member and the socket are prevented from rotation relative to each other.

During the attaching operation, the deformable tab 32 digs into the surface of the sheet and then collapses toward the base to pinch a portion of the sheet between the end of the tab and the base, so that rotation of the socket relative to the sheet is prevented. Since the tab 32 does not collapse completely, but remains slightly inclined relative to the base, the portion of the sheet disposed over the tab will be compressed against the attaching cap more tightly than the rest of the sheet under the cap. Before attachment, the socket and the attaching member are so aligned that after attachment, this compressed portion of the sheet is disposed between an adjacent pair of arms 46, and thereby assists in preventing rotation of the attaching cap relative to the sheet.

The provision of the tab on the socket and the cooperating arms on the socket is more fully described in an application entitled Snap Fastener Socket Assembly, Serial No. 191,408, filed October 21, 1950, which issued on July 7, 1953, as Patent No. 2,644,215 and which assigned to the same assignee as this application, and is illustrated here as being only one method by which the parts of the fastener may be prevented from rotating relative to the supporting sheet, which is particularly useful in installations where it preferred that the supporting sheet be pierced only at the point where the rivet passes therethrough. In other installations means may be provided on one of the members off-center from the rivet for piercing completely through the sheet for direct engagement with the other member to provide means for preventing rotation of the parts on the sheet and to provide auxiliary means for preventing rotation of the parts relative to each other.

Although in the illustrated embodiment, the opening 20 in the socket base is square with four upturned lips, this particular number is not essential. It is only necessary that the disposition of the lips be sufficiently non-circular to accomplish the result of preventing rotation of the parts.

Since certain other obvious modifications may be made in the device without departing from the scope of the invention, it is intended that all matter contained herein be interpreted in an illustrative and not in a limiting sense.

I claim:

1. In a snap fastener assembly, a socket member and an attaching member assembled onto opposite sides of a supporting sheet, said socket member having a stud-engaging portion and an attaching base, said base having a polygonal opening disposed therethrough, the edges of the base about the opening being turned upwardly out of the plane of the base to form a polygonal wall having substantially straight sided segments about the opening, said attaching member having a hollow attaching rivet non-rotatably secured thereto and protruding therefrom through the supporting sheet and into the opening in the base, the end portion of said rivet having radially turned-out segments extending over the sides of the polygonal wall and then downwardly, the ends of said segments abutting the base of the socket alongside the polygonal wall.

2. In a snap fastener assembly as set forth in claim 1, the socket member and attaching member as set forth therein in which the opening in the socket is substantially square with four wall segments disposed thereabout, and the end portion of said rivet is split into four segments, the end of each of said rivet segments abutting the base alongside the wall segment over which it is curled throughout substantially the entire length of said wall segment.

References Cited in the file of this patent

UNITED STATES PATENTS

| Number | Name | Date |
|---|---|---|
| 894,270 | Holmes | July 28, 1908 |
| 1,514,913 | Koronski | Nov. 11, 1924 |
| 1,652,140 | Elwell | Dec. 6, 1927 |
| 1,871,373 | Johnson | Aug. 9, 1932 |
| 2,552,764 | Bedford | May 15, 1951 |

FOREIGN PATENTS

| Number | Country | Date |
|---|---|---|
| 406,805 | France | Dec. 16, 1909 |